United States Patent [19]
Wagner

[11] 3,865,829
[45] Feb. 11, 1975

[54] PROCESS FOR THE MANUFACTURE OF THE PURE ISOMERS OF NAPHTHOYLENE-BIS-BENZIMIDAZOLES

[75] Inventor: Dieter Wagner, Coventry, R.I.

[73] Assignee: Farbwerke Hoechst Aktiengesellschaft vormals Meister Lucius & Bruning, Frankfurt/Main, Germany

[22] Filed: June 16, 1969

[21] Appl. No.: 833,763

[52] U.S. Cl. ............................................. 260/282
[51] Int. Cl. ............................................ C07d 39/00
[58] Field of Search ...................... 260/309.2, 282

[56] References Cited
UNITED STATES PATENTS

| | | | |
|---|---|---|---|
| 1,765,661 | 6/1930 | Eckert et al. | 260/282 |
| 1,927,928 | 9/1933 | Eckert et al. | 260/282 |
| 2,908,685 | 10/1959 | Bloom et al. | 260/282 |

FOREIGN PATENTS OR APPLICATIONS

| | | | |
|---|---|---|---|
| 457,980 | 3/1928 | Germany | 260/309.2 |
| 567,210 | 12/1932 | Germany | 260/309.2 |
| 1,152,492 | 8/1962 | Germany | 260/309.2 |

*Primary Examiner*—Norma S. Milestone
*Assistant Examiner*—S. D. Winters
*Attorney, Agent, or Firm*—Curtis, Morris & Safford

[57] ABSTRACT

Process for preparing pure isomers of naphthoylene-bis-benzimidazoles, wherein naphthalene-1,4,5,8-tetracarboxylic acid or its anhydride is reacted in a low boiling alcohol with 1,2-diamino-benzenes, the mixture of isomers is converted into the alkali metal addition compounds by treating with alkali in the same medium, the alkali metal addition compounds of the two isomers are separated on the basis of their different solubility and wherein the separated addition compounds are hydrolized to the pure isomers.

10 Claims, No Drawings

PROCESS FOR THE MANUFACTURE OF THE PURE ISOMERS OF NAPHTHOYLENE-BIS-BENZIMIDAZOLES

The present invention relates to a process for the manufacture of the pure isomers of naphthoylene-bis-benzimidazoles.

The manufacture of naphthoylene-bis-benzmidazoles from naphthalene-1,4,5,8-tetracarboxylic acid or its anhydrides and 1,2-diamino-benzene is described in German Patent 430,632. The reaction components are either melted without solvents or heated in a higher boiling solvent, for example in nitrobenzene. In this condensation, an isomer mixture of the cis- form and trans- form of napthoylene-bis-benzimidazole is obtained. The two isomers can be separated from each other, for example according to the method described in German Patent 567,210 in suitable, mostly low boiling solvents because of the difference of solubility of their alkali metal addition compounds. Thus, condensation and separation of the isomers are carried out in two different solvents, which makes it necessary to isolate and to dry the isomer mixture intermediately.

Now, we have found that the pure isomers of naphthoylene-bis-benzimidazole can be obtained by a one stage process wherein naphthalene-1,4,5,8-tetracarboxylic acid or its anhydrides are condensed, under elevated pressure, with 1,2-diaminobenzenes which may be substituted, in low boiling alcohols and at temperatures in the range of from 120° to 180°C, the isomer mixture that has formed is converted into the alkali metal addition compounds by treatment with alkalis in the same medium and these addition compounds are separated by filtration from one another making use of their different solubility. When the separation is completed, the pure isomers of the dyestuffs are recovered from their alkali metal addition compounds by hydrolysis with water or with diluted mineral acids.

Of the 1,2-diamino-benzenes used for the condensation with naphthalene-1,4,5,8-tetracarboxylic acid or its anhydrides, there may be mentioned 1,2-diaminobenzene itself as well as its substitution products, for example, 4-chloro-1,2-diamino-benzene, 4-methyl-1,2-diamino-benzene or 4-chloro-5-ethoxy-1,2-diamino-benzene. As a low boiling alcohol, ethanol is especially suited for carrying out the process of the present invention; other alcohols, for example methanol, may also be used for this purpose. The alkalis used according to the present invention for the preparation of the alkali metal addition compounds are chiefly sodium hydroxide or potassium hydroxide because of their easy accessibility. The condensation of the process of the present invention is accelerated by the addition of catalytic amounts of an organic acid, preferably acetic acid.

It is surprising that the condensation proceeds so smoothly in low boiling alcoholic solvents, since, it is stated in German Patent 457,980 that from naphthalene-1,4,5,8-tetracarboxylic acid and 1,2-diamino-benzenes not more exactly characterized intermediate products are obtained only. These intermediate products must be isolated and pass into the naphthoylene-bis-benzimidazoles only by boiling in high boiling solvents or by dry heating to 150°C.

The process of the present invention has the advantage that for preparing the pure isomers of naphthoylene-bis-benzimidazoles starting from naphthalene-1,4,5,8-tetracarboxylic acid, only one solvent is required instead of the two solvents hitherto used. Since this solvent has a low boiling point, it can be regenerated in a simple and energetically favorable manner.

The naphthoylene-bis-benzimidazoles of both configurations are vat dyestuffs and yield dyeings that have excellent fastness to light and to wet processing. They may also be used as pigment dyestuffs, because they have a very good fastness to solvents, to overspray lacquering and to over lacquering by baking lacquers.

The following Example illustrates the present invention but it is not intended to limit it thereto.

EXAMPLE

100 Parts by weight of naphthalene-1,4,5,8-tetracarboxylic acid anhydride and 76 parts by weight of 1,2-diaminobenzene were combined with 12.5 parts by weight of acetic acid in 650 parts by weight of ethanol and heated for 8 hours in an autoclave to a temperature of 150°C. A pressure of about 10 atmospheres gauge was established during this time. Ethanol was then added to the suspension of the scarlet dyestuff mixture that had formed until a volume of 1,150 parts by volume was reached and the suspension was mixed with 270 parts by weight of potassium hydroxide. The mixture was heated to boiling temperature, for 2 hours, suction-filtered to retain the undissolved matter which was washed thoroughly with a 30 % alcoholic solution of potassium hydroxide. The filter residue was hydrolyzed in 1000 parts by volume of water having a temperature of 60°C. After suction-filtering, washing to neutrality and drying, about 70 parts by weight of the bright orange-colored transisomer were obtained. This dyestuff yields on cotton, from a yellow-green vat, a brilliant orange dyeing having a very good fastness to light, to washing and to chlorite. The dyeings of the dyestuff in nitro lacquer are absolutely fast to overspraying, and those in plasticized polyvinyl chloride have a very good fastness to bleeding.

By acidification of the alcoholic mother liquor and washing liquor with diluted mineral acid, about 55 parts by weight of the dark-red cis-isomers were obtained. The dyestuff was obtained in purer form when first removing a part of the ethanol by distillation from the combined mother liquors, suction-filtering the precipitated potassium addition compound and subsequently hydrolyzing it in warm water. Cotton was dyed a bordeaux red shade with this dyestuff from an olive green vat. The fastness properties corresponded to those of the isomer dyestuff.

In the process of the present invention, methanol can be used instead of ethanol, and likewise the potassium hydroxide can be replaced by sodium hydroxide.

The condensation proceeds in a similar manner if, in the Example indicated above, equivalent amounts of 4-chloro-1,2-diamino benzene, 4-methyl-1,2-diaminobenzene or 4-chloro-5-ethoxy-1,2-diamino-benzene were used instead of the 1,2-diamino-benzene.

I claim:

1. A process for the preparation of pure cis- and trans- isomers of naphthoylene-bis-benzimidazole in a single reaction medium which comprises reacting naphthalene-1,4,5,8-tetracarboxylic acid or the anhydride thereof with 1,2-diaminobenzene or 1,2-diaminobenzene substituted by up to two members selected from the group consisting of chlorine, lower alkyl and lower alkoxy in a low-boiling alcohol at a temperature between about 120°C. and 180°C. at elevated pressure to form a reaction mixture of cis- and trans- isomers of said benzimidazole, adding to said reaction mixture an alkali metal hydroxide to form an insoluble alkali metal addition compound of the trans- isomer and a soluble alkali metal addition compound of the cis- isomer, separating said insoluble alkali metal addition compound from the reaction mixture, hydrolyzing each of said alkali metal addition compounds to form the respective benzimidazole isomers, and recovering each of said isomers.

2. A process according to claim 1 wherein said insoluble alkali metal addition compound is separated by filtration, hydrolyzed with water or a mineral acid, neutralized and dried.

3. A process according to claim 1 wherein said soluble alkali metal addition compound is hydrolyzed with water or a mineral acid, neutralized and dried.

4. A process according to claim 3 wherein, after separating said insoluble alkali metal addition compound, the reaction mixture is acidified with a mineral acid.

5. A process according to claim 1 wherein said diaminobenzene is 1,2-diaminobenzene, 4-chloro-1,2-diaminobenzene, 4-methyl-1,2-diaminobenzene or 4-chloro-5-ethoxy-1,2-diaminobenzene.

6. A process according to claim 1 wherein said low-boiling alcohol is methanol or ethanol.

7. A process according to claim 1 wherein said alkali metal hydroxide is sodium hydroxide or potassium hydroxide.

8. A process according to claim 1 wherein said tetracarboxylic acid and said diaminobenzene are reacted in the presence of a catalytic amount of an organic acid.

9. A process according to claim 8 wherein said organic acid is acetic acid.

10. A process according to claim 1 wherein said isomers are recovered by drying.

* * * * *